United States Patent [19]

Ishitate

[11] Patent Number: 4,682,244
[45] Date of Patent: Jul. 21, 1987

[54] OPTICAL RECORDING DEVICE
[75] Inventor: Yoshiyuki Ishitate, Kanagawa, Japan
[73] Assignee: Fuji Xerox Co., Ltd., Tokyo, Japan
[21] Appl. No.: 791,537
[22] Filed: Oct. 25, 1985
[30] Foreign Application Priority Data
  Nov. 7, 1984 [JP] Japan .................. 59-233337
[51] Int. Cl.⁴ .............................. H04N 1/04
[52] U.S. Cl. .................. 358/287; 358/300; 358/302; 346/108; 346/160
[58] Field of Search ............... 358/287, 300, 302; 346/108, 160
[56] References Cited
  U.S. PATENT DOCUMENTS
  3,736,046  5/1973  Zook ........................ 346/108
  4,423,439  12/1983 Watanabe ............... 358/287

Primary Examiner—L. T. Hix
Assistant Examiner—D. Rutledge
Attorney, Agent, or Firm—Finnegan, Henderson, Farabow, Garrett and Dunner

[57] ABSTRACT

An optical recording device for producing images as a whole at a predetermined scale size includes a beam oscillator for producing a beam, a scanner for line-scanning the beam produced by the beam oscillator, a recording mechanism for receiving the line-scanned beam in the form of a scanned spot and for recording an image formed by the scanned spot, and a variably sized aperture for receiving the beam and determining the size of the scanned spot.

5 Claims, 10 Drawing Figures

OPTICAL RECORDING DEVICE

BACKGROUND OF THE INVENTION

I. Field of the Invention

This invention relates to an optical recording device such as a laser printer.

II. Description of the Prior Art

Optical recording devices using a laser beam can be roughly divided into a group of optical mode recording devices and a group of heat mode recording devices. Optical mode recording devices use either a photo-sensitive material employed in an electrophotographic recording system or an ordinary silver salt photo-sensitive material as a recording material. A laser beam is used to optically form an image on the recording material. The heat mode recording devices use a heat-sensitive sheet or a thermal transfer sheet as a recording material. A laser beam is used to thermally form an image onto the recording sheet.

FIG. 10 is an explanatory diagram outlining one example of a conventional optical recording device using an optical mode electrophotographic recording system.

As shown in FIG. 10, an optical recording device including a drum-shaped photo-sensitive body 1 is turned in the direction of the arrow as its surface is uniformly charged by a charging unit 2. A video signal generating circuit 3 supplies a video signal 4 to an optical modulator 5 with predetermined timing. A laser beam generator 6 transmits a laser beam 7 to the optical modulator 5, so that the laser beam 7 is modulated according to the video signal 4. The modulated laser beam 7 passes through a lens 8 to a scanning means such as polygon mirror 10 which is turned at a constant speed by a motor 9. Polygon mirror 10 includes a series of mirrors which are arranged to constitute the sides of a polygon. The laser beam reflected from the polygon mirror 10 performs the main scanning of the photo-sensitive body 1 by horizontally scanning the charged picture region of the photo-sensitive body 1.

The auxiliary scanning is achieved by the rotation of the photo-sensitive body 1 in the direction of the arrow. Such rotation is preferably made in a step-wise fashion by a stepping motor. Thus, an electrostatic latent image corresponding to the video signal 4 is formed in the picture region of the photo-sensitive body 1. The latent image is developed with toner when passing through a developing unit 11 so that a toner image is formed on the photo-sensitive body 1. Therefore, photo-sensitive body 1 constitutes a means for receiving the line-scanned beam in the form of a scanned spot and for recording an image formed by the scanned spot.

A recording sheet 12 supplied from a sheet supplying tray (not shown) is delivered between the photo-sensitive body 1 and a transferring unit 13 with predetermined timing so that the toner image on the photo-sensitive body 1 is transferred onto the recording sheet 12. The sheet 12 is delivered to a fixing unit 14, where the image on the sheet 12 is fixed. Then the treated sheet is sent to an ejecting tray (not shown). The toner remaining on the surface of the photo-sensitive body 1 is discharged by a discharging unit 15 and removed by a cleaning unit 16.

When an electronic copying machine uses a scan unit comprising lenses according to an image magnifying factor, a copying operation is performed by directly increasing or decreasing the size of the image of an original. Therefore, when the image as a whole is increased or decreased in size, dots and lines forming the image are also increased or decreased in size. Accordingly, when the image thus changed in size is copied, the resultant image is completely similar to the image of the original. In other words, the copied image is a realistic copy.

However, in the optical recording device described above, the laser beam 7 is so designed that its spot size is uniform in the range of from 25 um to 75 um. When an image is recorded, and its size is increased or decreased, although the image as a whole is increased or decreased in size, the size of the dots forming the image remain unchanged. Accordingly, the resultant image is not completely similar to the original image. In other words, the copied image is not a realistic copy.

SUMMARY OF THE INVENTION

Accordingly, an object of this invention is to provide an optical recording device in which the spot size of a light beam such as a laser beam can be selectively changed.

The foregoing object and other objects of the invention have been achieved by the provision of an optical recording device which, according to the invention comprises: a beam oscillator; scanning means for line-scanning a beam produced by the beam oscillator; a recording material on which an image is formed as the beam is applied in the form of a spot thereto; a variable diaphragm for changing the spot size of the beam applied to the recording material; and means for controlling the aperture size of the variable diaphragm.

The nature, principle and utility of the invention will become more apparent from the following detailed description when read in conjunction with the accompanying drawings.

DETAILED DESCRIPTION OF THE INVENTION

Figure 1:
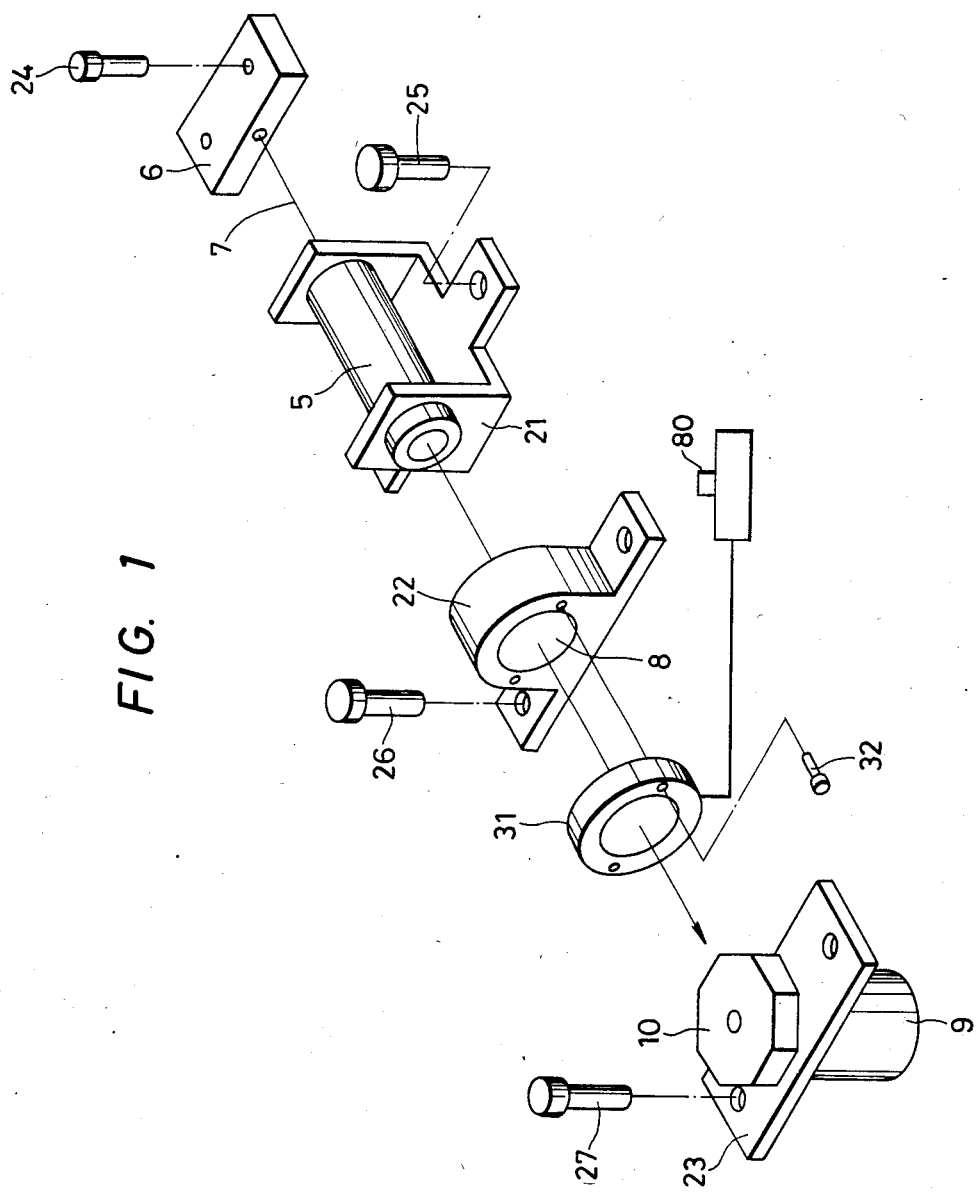
FIG. 1 is an exploded perspective view showing essential components of one example of an optical recording device according to the invention.
Figure 10:
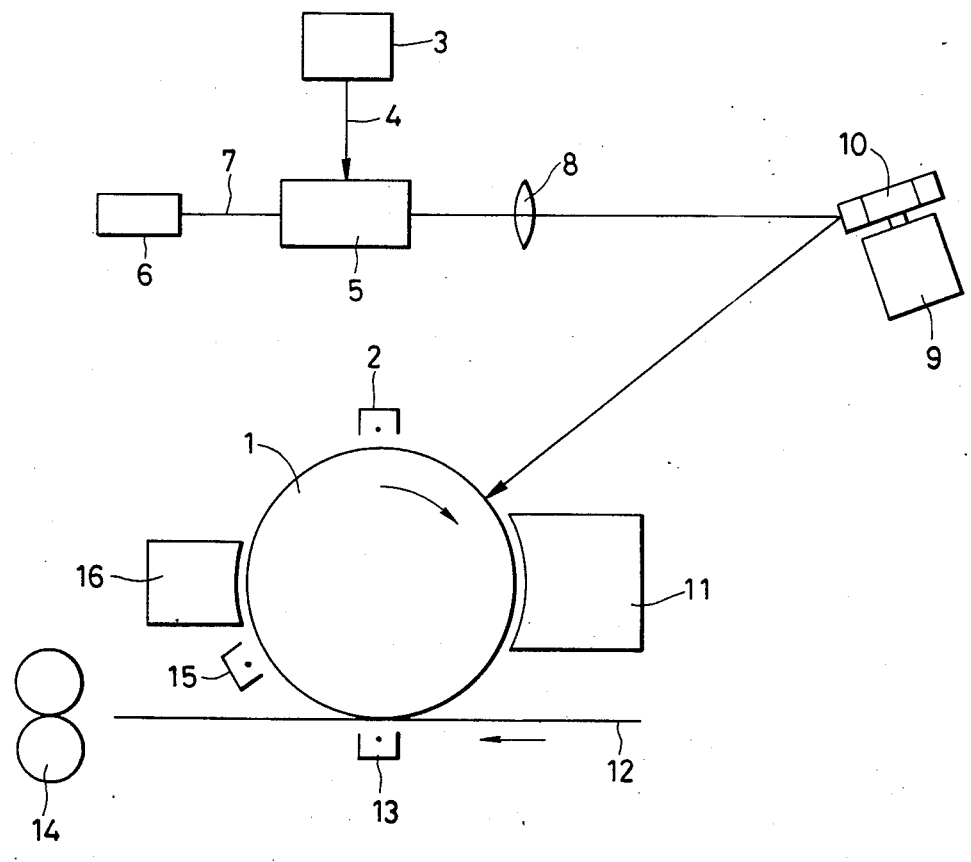
FIG. 10 is an explanatory diagram showing the arrangement of an optical recording device.

FIG. 1 shows components of one example of an optical recording device according to this invention. In FIG. 1, those components which have been previously described with reference to FIG. 10 are designated by the same reference numerals.

In the optical recording device, a laser beam oscillator 6, the supporting member 21 of an optical modulator 5, the supporting member 22 of a lens 8, and the supporting member 23 of an electric motor 9 are secured to a supporting stand (not shown) with screws 24, 25, 26 and 27. A variable diaphragm 31 is used for varying the spot size of a laser beam 7 passed through the lens 8. Screws 32 are used to mount diaphragm 31 on the side of the supporting member 21 of the lens which faces the polygon mirror 10. The variable diaphragm 31 can be an iris diaphragm or a liquid crystal diaphragm.

Figure 2:
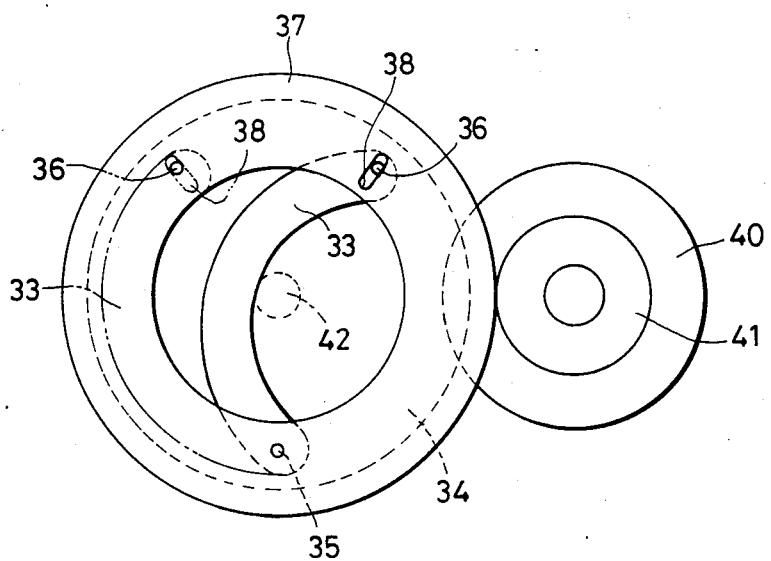
FIG. 2 is a front view, with parts removed, showing one example of a variable diaphragm used in one embodiment of the invention.

A mechanical iris diaphragm is shown in FIG. 2. One end of an arcuate blade 33 is rotatably mounted on a pin 35 embedded in a stationary ring 34. A pin 36 embedded in the other end of the blade 33 is loosely fitted in an elongated hole 38 in a rotary ring 37. In the iris diaphragm, a plurality of such blades 33 are arranged at certain intervals. A pinion 41 is provided on the output shaft of a step-motor to engage with teeth which are formed in the periphery of the rotary ring 37. As the step-motor rotates in the forward direction or in the reverse direction, the rotary ring 37 is turned in the forward direction or in the reverse direction, so that each blade 33 is swung between the position indicated by the solid line and the position indicated by the two-sot chain line. As a result, a substantially round opening 42 is formed by the plurality of blades 33. The size of opening 42 can be changed stepwise.

Figure 3:
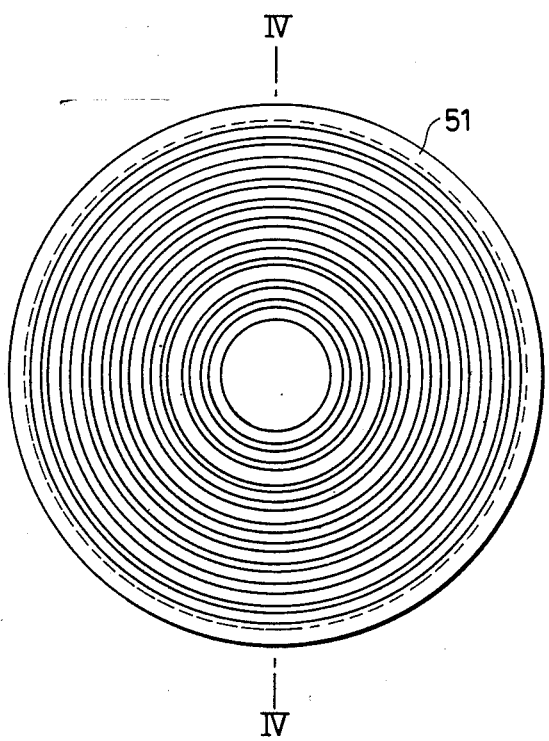
FIG. 3 is a front view showing another example of a variable diaphragm.
Figure 4:
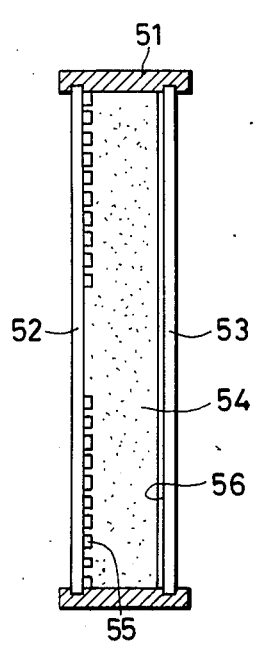
FIG. 4 is a sectional view taken along the IV—IV in FIG. 3.

A liquid crystal diaphragm is shown in FIGS. 3 and 4. Round glass plates 52 and 53 are provided on both sides of a ring-shaped frame 51 to form a container. The container thus formed is filled with liquid crystal 54. A plurality of ring-shaped transparent electrodes 55 are coaxially provided on the inner surface of the glass plate 52. The inner surface of the glass plate 53 is covered with a plate-shaped transparent electrode 56.

In the liquid crystal diaphragm, when voltage is applied between the plate-shaped transparent electrode 56 and the outer ring-shaped transparent electrodes 55, the liquid crystal 54 in the part to which the voltage has been applied becomes opaque. As a result the size of the transparent part of the liquid crystal 54 changes stepwise. This is the part of the crystal to which no voltage is applied.

In the variable diaphragm 31, the size of the aperture means, namely, the size of the opening 42 of the mechanical iris, or the size of the transparent part of the liquid crystal, is changed stepwise with the aid of a signal which controls the rotation of step-motor 40 or a signal for selectively applying voltage to the ring-shaped transparent electrodes 55. The variable diaphragm 31 is designed so that its aperture size can change in a range of from somewhat larger than a standard size to somewhat smaller than the standard size. The term "standard size" is intended to mean the spot size of the laser beam 7 in a life-size 1:1 recording operation.

One example of recording an image by increasing or decreasing its size with the optical recording device will be briefly described.

The size of the image as a whole in the auxiliary scanning direction is increased or decreased by controlling the speed of rotation of the photo-sensitive body 1, shown in FIG. 10, in the direction of the arrow. The speed of rotation of the photo-sensitive body 1 depends on the scale factor and is also set by the scale factor setting control button on the operating panel of the device (not shown). The ratio of the speeds is 3:4:5 when the scale factor is set of 75%, 100% and 125%. (75%:100%:125%=3:4:5).

In the optical recording device described above, the size of the image as a whole is stepwise increased or decreased. In addition, to increasing or decreasing the size of the image as a whole as described above, the aperture size of the variable diaphragm 31 is changed as the size of an image as a whole is increased or decreased to control the size of the dots forming the image.

When the scale factor is 100%, the size of a white dot forming the image is represented by $d_{100}$. When the size of the image is increased or decreased with a scale factor of n%, the size of a white dot, represented by $d_n$, is similarly increased or decreased according to the following equation:

$$d_n = n/100 \times d_{100}$$

If the period of time for applying the laser beam for each dot is relatively short when compared with the speed of movement of the beam or the photo-sensitive body, the aperture size of the variable diaphragm 31 is controlled to correspond to the white dot size $d_n$, so that the spot size of the laser beam will correspond to the white dot size $d_n$.

Figure 5:
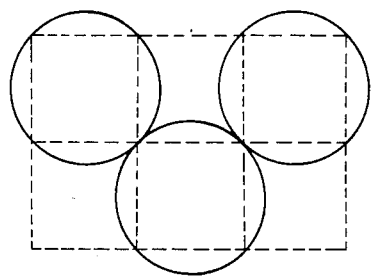
FIGS. 5 through 9 are explanatory diagrams for a description of the operation of recording an image by increasing or decreasing its size with the optical recording device of the invention for comparison with the images produced by a conventional optical recording device.
Figure 6:
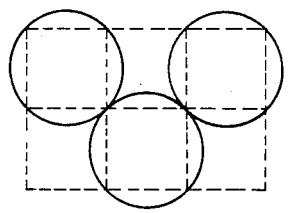
Figure 7:
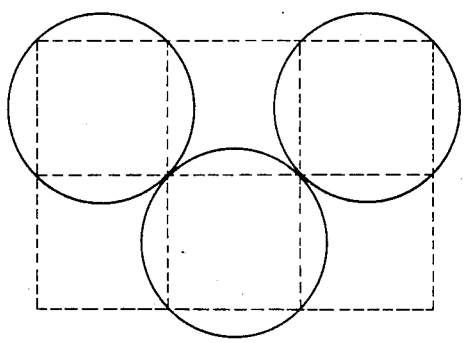

FIG. 5 shows one example of white dots (circles) which are recorded at intervals of two dots in a life-size (100%) recording operation. When the optical recording device of the invention performs an operation of recording white dots with a scale factor of 75% (or ¾), the white dots are recorded as shown in FIG. 6. In a recording operation with a scale factor of 125% (5/4), the white dots are recorded as shown in FIG. 7.

Figure 8:
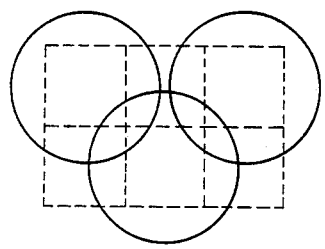
Figure 9:
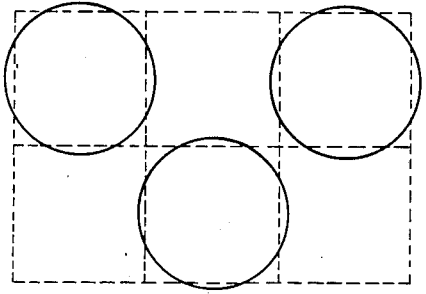

On the other hand, with a conventional optical recording device, the size of white dots is maintained unchanged. Therefore, when a conventional optical recording device performs an operation of recording an image by decreasing its size to three-fourths (¾), white dots are recorded as shown in FIG. 8. In an operation of recording an image by increasing its size to five-quarters (5/4), white dots are recorded as shown in FIG. 9.

It should be noted that if the liquid crystal diaphragm is employed as the variable diaphragm 31, and square transparent electrodes are employed as the transparent electrodes 55, square white dots similar to the size of the picture elements can be obtained.

When the optical recording device of the invention records an image by increasing or decreasing its size, the size of white dots is similarly increased or decreased. Therefore, the resultant image is realistic and fine in picture quality. On the other hand, with a conventional optical device, the resultant image is unavoidably low in picture quality.

In the embodiment described above, a scale factor for an image can be set by operating the scale factor setting control button. However, the invention is not limited to this manner of control. For instance, the scale factor may be determined from the size of an original and the size of a recording sheet.

In the embodiment described above, the aperture size of the variable diaphragm 31 is changed according to the scale factor set for the image. However, the invention is not limited to this manner of control. For instance, a changeover switch may be provided to change the aperture size of the variable diaphragm 31 according to the scale factor set for the image, or the aperture size may be changed to a desired value independent of the scale factor by operating a control button 80 shown in FIG. 1. According to this method, the size of white dots can be increased even in a life-size recording operation. Also, in the operation of recording an image by decreasing its size, the size of white dots can be made equal to the size of white dots in the life-size recording operation. Thus, the optical recording operation can be performed with different or particular images.

The optical recording device has been described in relation to electrophotographic recording. However, the technical concept of the invention is applicable to other optical mode recording devices or heat mode recording devices. In addition a plasma beam may be employed instead of the laser beam, as the beam 7.

As is apparent from the above description, according to the invention, the spot size of a beam such as a laser beam can be changed, and therefore the size of dots can be freely changed. For instance when the spot size of the beam is changed according to the scale factor set for the image, the size of dots is similarly changed. As a result the formed image is similar to the original picture. Furthermore, when the spot size of the beam is changed irrespective of the scale factor, the recording operation is achieved with different or special images.

I claim:

1. An optical recording device for printing scanned images as a whole at a predetermined scale size comprising:
   a beam oscillator for producing a beam;
   scanning means for line-scanning the beam produced by the beam oscillator;
   means for receiving the line-scanned beam in the form of a scanned spot and for recording an image formed by the scanned spot; and
   aperture means for varying the size of said line-scanned beam and thereby varying the size of printing dots formed by said scanned spot to enhance resolution of a printed scaled image.

2. An optical recording device as claimed in claim 1, including control means for changing the size of the aperture means according to a scale factor set for the image to be formed so that the scanned spot size is set to be the same scale size as the predetermined scale size of the image as a whole.

3. An optical recording device as claimed in claim 1, including control means for changing the size of the aperture means independent of the scale factor set for the image to be formed.

4. A method of printing scanned images as a whole at a predetermined scale size comprising:
   generating a beam;
   line-scanning the beam onto a recording material in the form of a scanned spot;
   varying the size of the scanned spot and printing dots formed by said scanned spot in accordance with a predetermined scale size of the recorded image as a whole to thereby enhance the resolution of the printed scaled image.

5. The method of claim 4 wherein the step of determining the size of said scanned spot is carried out by controlling an optical aperature through which said beam passes prior to forming the scanned spot.

* * * * *